US008737337B2

(12) United States Patent
Lee et al.

(10) Patent No.: US 8,737,337 B2
(45) Date of Patent: May 27, 2014

(54) METHOD AND APPARATUS FOR TRANSMITTING A SOUNDING SIGNAL IN A MULTIPLE INPUT MULTIPLE OUTPUT WIRELESS MOBILE COMMUNICATION SYSTEM

(75) Inventors: Wook Bong Lee, Anyang-si (KR); Jin Young Chun, Anyang-si (KR); Hyun Soo Ko, Anyang-si (KR); Moon Il Lee, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 113 days.

(21) Appl. No.: 13/379,576

(22) PCT Filed: Jun. 30, 2010

(86) PCT No.: PCT/KR2010/004228
§ 371 (c)(1),
(2), (4) Date: Dec. 20, 2011

(87) PCT Pub. No.: WO2011/002214
PCT Pub. Date: Jan. 6, 2011

(65) Prior Publication Data
US 2012/0106492 A1     May 3, 2012

Related U.S. Application Data

(60) Provisional application No. 61/222,473, filed on Jul. 1, 2009.

(30) Foreign Application Priority Data

Jul. 1, 2009 (KR) ........................ 10-2010-0043820

(51) Int. Cl.
*H04W 72/04* (2009.01)

(52) U.S. Cl.
USPC ........................................................ 370/329

(58) Field of Classification Search
USPC .......... 370/252, 329, 431, 437; 375/132, 135, 375/136, 346; 455/101, 115.1, 452.1, 509
See application file for complete search history.

(56) References Cited

U.S. PATENT DOCUMENTS

2003/0058926 A1*   3/2003   Balakrishnan et al. ....... 375/146
(Continued)

OTHER PUBLICATIONS

Vook, et al., "Improvements to the Uplink Channel Sounding Signaling for OFDMA", Jan. 25, 2005, IEEE 802.16 Broadband Wireless Access Working Group IEEE C802.16e-04/422r4, whole document.*
A. Ghosh, et al., "Uplink Control Channel Design for 3GPP LTE", 2007 IEEE 18th International Symposium on Personal, Indoor and Mobile Radio Communications, pp. 1-5, Sep. 3-7, 2007.

(Continued)

*Primary Examiner* — Andrew Chriss
*Assistant Examiner* — Jose Perez
(74) *Attorney, Agent, or Firm* — McKenna Long & Aldridge LLP (57) ABSTRACT

The present invention relates to transmitting a sounding signal in a multiple input multiple output (MIMO) wireless mobile communication system. According to the present invention, a user equipment that supports a plurality of transmitting antennas receives a plurality of uplink sounding transmission control information elements from a base station. Each of the plurality of uplink sounding transmission control information elements includes respective cyclic period information for periodically repeating sounding signal transmission and respective antenna designation information for designating one or more antennas through which the sounding signal is to be transmitted among a plurality of transmission antennas of the user equipment. The user equipment, then, transmits a sounding signal through selected number of transmission antennas according to the antenna designation information of the uplink sounding transmission control information element having the shortest cycle period among the plurality of uplink sounding transmission control information elements.

14 Claims, 5 Drawing Sheets

(56) References Cited

U.S. PATENT DOCUMENTS

| | | |
|---|---|---|
| 2006/0034165 A1 | 2/2006 | Levy |
| 2006/0035643 A1* | 2/2006 | Vook et al. .................... 455/450 |
| 2006/0209923 A1* | 9/2006 | Jin et al. ........................ 375/130 |
| 2007/0280340 A1* | 12/2007 | Hwang et al. ................. 375/222 |
| 2008/0123589 A1* | 5/2008 | Lee et al. ...................... 370/329 |
| 2009/0154530 A1* | 6/2009 | Fulghum ....................... 375/147 |

OTHER PUBLICATIONS

N.B. Mehta, et al.,"Antenna Selection Training in MIMO-OFDM/OFDMA Cellular Systems", 2007 2nd International Workshop on Computational Advances in Multi-Sensor Adaptive Processing, pp. 113-116, Dec. 12-14, 2007.

F.W. Vook, et al.,"Improvements to the Uplink Channel Sounding Signaling for OFDMA", IEEE 802.16 Broadband Wireless Access Working Group IEEE C802.16e-04/422r4, Jan. 25, 2005.

* cited by examiner

METHOD AND APPARATUS FOR TRANSMITTING A SOUNDING SIGNAL IN A MULTIPLE INPUT MULTIPLE OUTPUT WIRELESS MOBILE COMMUNICATION SYSTEM

This application is a 35 U.S.C. §371 National Stage entry of International Application No. PCT/KR2010/004228, filed on Jun. 30, 2010, and claims the benefit of priority of U.S. Provisional application Nos. 61/222,473 filed Jul. 1, 2009 and Korean Patent Application No. 10-2010-0043820 filed on May 11, 2010, all of which are incorporated by reference in their entirety herein.

FIELD OF THE INVENTION

The present invention relates to a wireless communication system and, more particularly, to a method and apparatus for transmitting a sounding signal in a wireless mobile communication system supporting multiple antennas.

BACKGROUND ART

A general description of multiple antennas (hereinafter referred to as "MIMO") technology will hereinafter be given as shown below.

MIMO, corresponds to an abbreviation (or acronym) of "Multiple Input Multiple Output, which refers to a method, which has evolved from the currently used conventional method of using one transmission antenna for one reception antenna, that can enhance data transmission and reception efficiency by using multiple transmission antennas and multiple reception antennas. More specifically, instead of relying on a single antenna path in order to receive one whole message, this method applies the technology of collecting a plurality of data segments, which are received from multiple antennas, so as to complete the transmitted data. By using the above-described MIMO technology, the data transmission rate may be enhanced within a predetermined system period, or a system range respective to a specific data transmission rate may be enhanced. More specifically, the MIMO technology corresponds to a next generation mobile communication technology that may be broadly used in mobile communication User Equipments (UEs) and relay stations. This technology is being highlighted as a new technology that can overcome the limitation in data transmission amount in mobile communication, which is already facing a great deal of limitation due the expansion of data communication.

Figure 1:
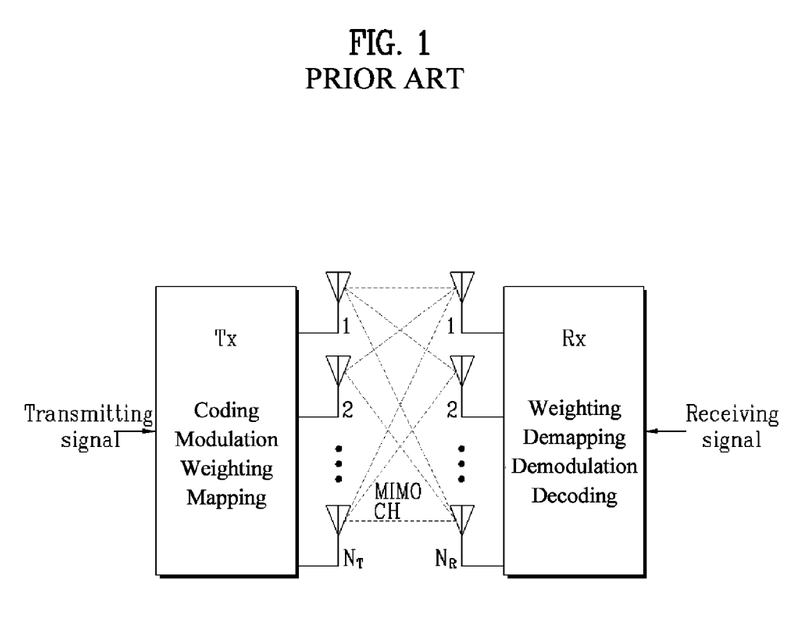
FIG. 1 illustrates the configuration of a general multiple antenna system.

FIG. 1 illustrates the configuration of a general multiple antenna system.

As shown in FIG. 1, when simultaneously increasing the number of antennas in both the transmitting end and the receiving end, unlike when only one of the receiver and the transmitter uses multiple antennas, a theoretical transmission data size (or capacity) increases in proportion to the number of antennas. Therefore, the frequency efficiency may be enhanced outstandingly.

After the theoretical increase in capacity of the MIMO system has been proven in the mid 90's, a wide range of technologies have been under research and development since then, in order to come with actual results of enhancing the data transmission rate. And, among such technologies, some of the successful technologies are being reflected and applied to diverse wireless communication standards, such as the $3^{rd}$ generation mobile communication standard, the next generation wireless LAN, and so on.

The active research and development related to multiple antennas technologies that have been carried out so far includes research in the aspect of information theory, which is related to calculating the capacity of multiple antennas communication in diverse channel environments and multiple access environments, research in measuring wireless (or radio) channels and creating models of the MIMO system, and research in a time-space signal processing technology for enhancing transmission reliability and enhancing the transmission rate. In other words, many research projects are being carried out is a wide range of aspects.

The MIMO technology includes a "spatial diversity" technique, which may increase transmission reliability by using symbols that have passed through a diversity of channel paths, and a "spatial multiplexing" technique, which may use multiple transmission antennas so as to transmit multiple data symbols at the same time, thereby enhancing the transmission rate. Furthermore, research in developing a method that can adequately yield the advantages of both techniques (spatial diversity and spatial multiplexing) is also one of the most focused field of research.

Figure 2:
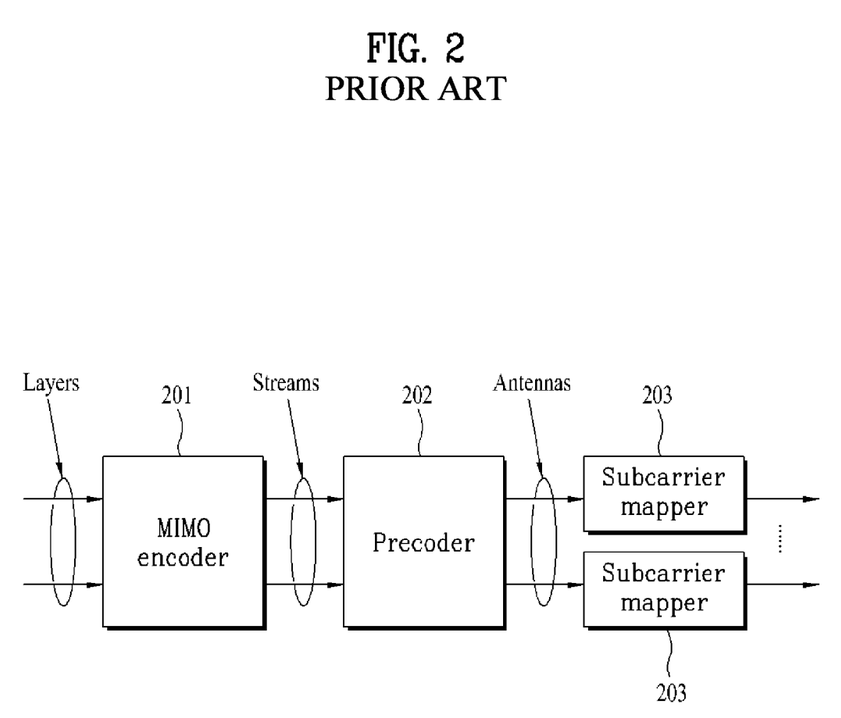
FIG. 2 illustrates a structure of the MIMO from the transmitting end.

FIG. 2 illustrates a structure of the MIMO from the transmitting end. As shown in FIG. 2, a MIMO encoder (201) maps $L(\geq 1)$ number of layers to $M_t(\geq L)$ number of streams. Each of the streams is inputted to a precoder (202). A layer may be defined as a coding and modulation path being inputted to the MIMO encoder (201). Additionally, a stream may be defined as an output of the MIMO encoder (201) passing through the precoder (202).

By generating an antenna specific data symbol in accordance with a selected MIMO mode, the precoder (202) may map the streams to the antennas.

A subcarrier mapper (203) maps the antenna specific data t OFDM symbols.

Layer to stream mapping is performed by the MIMO encoder (201). The MIMO encoder (201) corresponds to a batch processor that operates for M number of input symbols at once (i.e., in a single batch). The input respective to the MIMO encoder (201) may be expressed as an M×1 vector, as shown below in Equation 1.

$$S = \begin{bmatrix} s_1 \\ s_2 \\ \vdots \\ s_M \end{bmatrix} \qquad \text{Equation 1}$$

As shown in Equation 1, $S_i$ represents an $i^{th}$ input signal within a single batch of input symbols. The layer to stream mapping of the input symbols is first performed in a space dimension.

First of all, as shown in Equation 2, which is shown below, the output of the MIMO encoder (201) may be expressed as an $M_t \times N_F$ MIMO STC (Space Time Coding).

$$x = S(s). \qquad \text{Equation 2}$$

At this point, $M_t$ corresponds to the number of streams, and $N_F$ corresponds to a number of subcarriers occupied by one MIMO block. Also, x corresponds to the output of the MIMO encoder (201), s indicates an input layer vector, and S(s) represents an STC matrix.

Furthermore may be expressed as a matrix shown below in Equation 3.

$$X = \begin{bmatrix} x_{1,1} & x_{1,2} & \cdots & x_{1,N_F} \\ x_{2,1} & x_{2,2} & \cdots & x_{2,N_F} \\ \vdots & \vdots & \ddots & \vdots \\ x_{M_T,1} & x_{M_T,2} & \cdots & x_{M_T,N_F} \end{bmatrix} \quad \text{Equation 3}$$

In an SU-MIMO transmission, an STC rate may be defined by using Equation 4 shown below.

$$R = \frac{M}{N_F} \quad \text{Equation 4}$$

In an MU-MIMO transmission, the STC rate for one layer corresponds to 1.

There are three different formats of the MIMO encoder (201)—SFBC (Space Frequency Block Code), Vertical Encoding (VE), and Horizontal Encoding (HE).

In the SFBC (Space Frequency Block Code), the input being inputted to the MIMO encoder (201) may be expressed as a 2×1 matrix, as shown below in Equation 5.

$$X = \begin{bmatrix} s_1 & -s_s^* \\ s_2 & s_1^* \end{bmatrix} \quad \text{Equation 6}$$

The MIMO encoder (201) generates an SFBC matrix as shown below in Equation 6.

$$S = \frac{S_1}{S_2} \quad \text{Equation 5}$$

At this point, X corresponds to a 2×2 matrix, and the SFBC matrix X occupies two consecutive subcarriers.

In the Vertical Encoding (VE), the input and output of the MIMO encoder (201) may be expressed as an M×1 matrix, as shown below in Equation 7.

$$X = S = \begin{bmatrix} s_1 \\ s_2 \\ \vdots \\ s_M \end{bmatrix} \quad \text{Equation 7}$$

At this point, $S_i$ corresponds to an $i^{th}$ input symbol of one batch, and, with respect to the vertical encoding method, $S_1 \ldots S_M$ belong to the same layer.

In the Horizontal Encoding (HE), the input and output of the MIMO encoder (201) may be expressed as an M×1 matrix, as shown below in Equation 8.

$$X = S = \begin{bmatrix} s_1 \\ s_2 \\ \vdots \\ s_M \end{bmatrix} \quad \text{Equation 8}$$

At this point, $S_i$ corresponds to an $i^{th}$ input symbol of one batch, and, with respect to the horizontal encoding method, $S_1 \ldots S_M$ belong to different layers.

Hereinafter, a method for mapping a stream to an antenna will be described in detail.

The mapping of a stream to an antenna is performed by the precoder (202). The output of the MIMO encoder (201) is multiplied by $M_t \times N_t$, w. The output of the precoder is expressed as $M_t \times N_t$ matrix, z. The method for mapping a stream to an antenna may be realized by using Equation 9 shown below.

$$z = Wx \quad \text{Equation 9}$$

$$= \begin{bmatrix} z_{1,1} & z_{1,2} & \cdots & z_{1,N_F} \\ z_{2,1} & z_{2,2} & \cdots & z_{2,N_F} \\ \vdots & \vdots & \ddots & \vdots \\ z_{N_t,1} & z_{N_t,2} & \cdots & z_{N_t,N_F} \end{bmatrix}$$

$$= \begin{bmatrix} W_1 & W_2 & \cdots & W_M \end{bmatrix} \begin{bmatrix} x_{1,1} & x_{1,2} & \cdots & x_{1,N_F} \\ x_{2,1} & x_{2,2} & \cdots & x_{2,N_F} \\ \vdots & \vdots & \ddots & \vdots \\ x_{M,1} & x_{M,2} & \cdots & x_{M,N_F} \end{bmatrix}$$

At this point, $N_t$ corresponds to a number of transmission antennas, and $z_{j,k}$ corresponds to an output symbol being transmitted through a $j^{th}$ physical antenna over a $k^{th}$ subcarrier.

In case of a downlink, the base station may decide a number of transmission streams ($M_t$) depending upon the MIMO mode, which the user equipment is to receive, and the base station may also decide a pilot pattern that is to be transmitted. At this point, when the number of streams that are to be transmitted is equal to 1 or 2, a pilot pattern set may be decided by Equation 10 shown below.

A Sounding command IE (Information Element) for multiple uplink transmission antennas is defined. Herein, Sounding means a function that can maintain a consistent level of communication quality, by consistently (or continuously) measuring the transmission performance of many available frequencies and by changing a currently used frequency to a frequency of a better quality, when the quality of the frequency that is currently being used has become degraded. A sounding signal refers to a signal transmitted by the user equipment to the base station in order to perform the sounding function.

First of all, it has not been clarified as to where the sounding channel of each transmission antenna is to be transmitted. Presently, a single unique offset for FDM (Frequency Division Multiplexing) and a single unique cyclic shift for CDM (Code Division Multiplexing) are notified. However, when multiple antennas are supported in the user equipment, the multiple sounding channels are required to be notified. Therefore, when the number of transmission antennas for the sounding of the user equipment is equal to N, N number of consecutive sounding channel indexes may be allocated starting from the offset or cyclic shift value.

Figure 3:
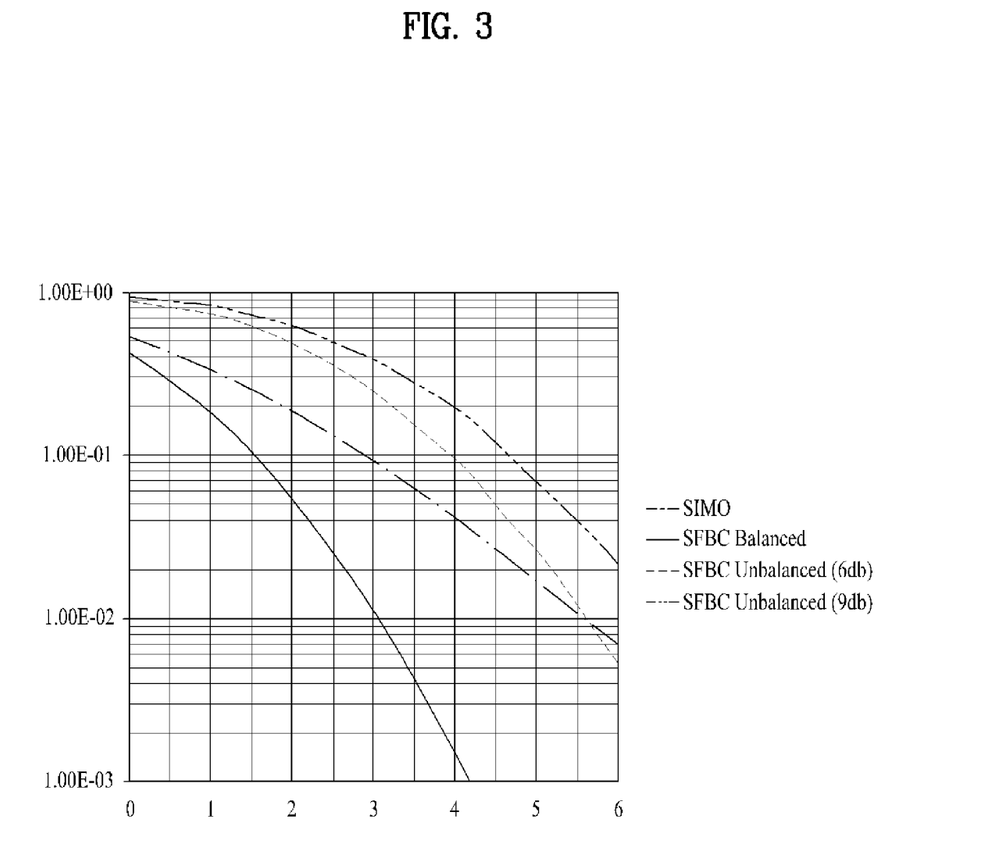
FIG. 3 illustrates a graph showing the influence of antenna power imbalance.

Also, the current user equipment transmits the same number of sounding channels as the actual transmission antennas. An antenna power imbalance may occur, for example, by a hand gripping direction or a polarized antenna direction. Therefore, a power imbalance pattern between each transmission antenna may change slowly rather than changing rapidly. FIG. 3 illustrates a graph showing the influence of antenna power imbalance.

As shown in FIG. 3, when the antenna power imbalance is greater than a specific threshold value, a single antenna transmission shows a more excellent performance than two antenna (SFBC; Space-Frequency Block Code) transmission.

In such situation, in order to resolve the problem of antenna power imbalance, an efficient method for controlling antennas that transmit sounding channels is being required.

DETAILED DESCRIPTION OF THE INVENTION

Technical Objects

A technical object of the present invention, which the present invention seeks to achieve, is to provide, a method and apparatus for transmitting a sounding signal that can efficiently control antennas that transmit sounding channels.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the object of the present invention, according to an embodiment of the present invention, in a wireless mobile communication system supporting Multiple Input Multiple Output (MIMO), a method for transmitting a sounding signal includes the steps of receiving, by a user equipment supporting multiple transmission antennas, at least one uplink sounding transmission control information from a base station, and transmitting the sounding signal by using the received uplink sounding transmission control information, wherein the sounding transmission control information may include periodicity information for periodically repeating sounding signal transmission and antenna designation information for designating an antenna through which the sounding signal is to be transmitted, among a plurality of transmission antennas.

When the user equipment supports two transmission antennas, the antenna designation information may designate which one of the two transmission antennas is used for transmitting the sounding signal.

When the user equipment supports four transmission antennas, the antenna designation information may designate which one of two transmission antenna groups is used for transmitting the sounding signal, each transmission antenna group including two transmission antennas.

Among the plurality of transmission antennas, when an antenna transmitting the sounding signal is referred to as a valid transmission channel, and when the user equipment receives a plurality of uplink sounding transmission control information, a number of valid transmission antennas being indicated by an uplink transmission control information having a shortest cycle period, among a plurality of cycle periods indicated by periodicity information respectively included in the plurality of uplink sounding transmission control information, may be set as a number of valid transmission antennas of the user equipment.

Among the plurality of transmission antennas, when an antenna transmitting the sounding signal is referred to as a valid transmission channel, and when the user equipment receives a plurality of uplink sounding transmission control information, and when cycle periods indicated by periodicity information respectively included in the plurality of uplink sounding transmission control information are identical to one another, a number of the plurality of transmission antennas may be set as a number of valid transmission antennas of the user equipment.

According to another exemplary embodiment of the present invention, in a wireless mobile communication system supporting Multiple Input Multiple Output (MIMO), a method for transmitting uplink sounding signal control information includes the steps of transmitting at least one uplink sounding signal control information to a user equipment supporting multiple transmission antennas, and receiving from the user equipment a sounding signal to which the uplink sounding signal control information has been applied, wherein the uplink sounding signal control information may include periodicity information for periodically repeating sounding signal transmission and antenna designation information for designating an antenna through which the sounding signal is to be transmitted, among a plurality of transmission antennas.

When a number of the plurality of transmission antennas is equal to 2, the antenna designation information may designate which one of the two transmission antennas is used for transmitting the sounding signal is to be transmitted.

When a number of the plurality of transmission antennas is equal to 4, the antenna designation information may designate which one of two transmission antenna groups is used for transmitting the sounding signal, each transmission antenna group including two transmission antennas.

According to yet another exemplary embodiment of the present invention, in a wireless mobile communication system supporting Multiple Input Multiple Output (MIMO), a user equipment supporting a plurality of transmission antennas includes a receiving unit configured to receive at least one uplink sounding signal control information from a base station, a processing unit configured to be electrically connected to the receiving unit and to generate a sounding signal by using the received uplink sounding signal control information, and a transmitting unit configured to be electrically connected to the processing unit and to transmit the generated sounding signal. Herein, the sounding signal control information may include periodicity information for periodically repeating sounding signal transmission and antenna designation information for designating an antenna through which the sounding signal is to be transmitted, among a plurality of transmission antennas.

When a number of the plurality of transmission antennas is equal to 2, the antenna designation information may designate which one of the two transmission antennas is used for transmitting the sounding signal.

When a number of the plurality of transmission antennas is equal to 4, the antenna designation information may designate which one of two transmission antenna groups is used for transmitting the sounding signal, each transmission antenna group including two transmission antennas.

Among the plurality of transmission antennas, when an antenna transmitting the sounding signal is referred to as a valid transmission channel, and when the user equipment receives a plurality of uplink sounding transmission control information, a number of valid transmission antennas being indicated by an uplink transmission control information having a shortest cycle period, among a plurality of cycle periods indicated by periodicity information respectively included in the plurality of uplink sounding transmission control information, may be set as a number of valid transmission antennas of the user equipment.

Among the plurality of transmission antennas, when an antenna transmitting the sounding signal is referred to as a valid transmission channel, and when the user equipment receives a plurality of uplink sounding transmission control information, and when cycle periods indicated by periodicity information respectively included in the plurality of uplink sounding transmission control information are identical to one another, a number of the plurality of transmission antennas may be set as a number of valid transmission antennas of the user equipment.

According to a further exemplary embodiment of the present invention, in a wireless mobile communication system supporting Multiple Input Multiple Output (MIMO), a base station includes a processing unit configured to generate at least one of uplink sounding signal control information in a user equipment supporting a plurality of transmission antennas, a transmitting unit configured to be electrically connected to the processing unit and to transmit the generated uplink sounding signal control information, and a receiving unit configured to be electrically connected to the transmitting unit and to receive from the user equipment a sounding signal to which the uplink sounding signal control information has been applied. Herein, the sounding signal control information may include periodicity information for periodically repeating sounding signal transmission and antenna designation information for designating an antenna through which the sounding signal is to be transmitted, among a plurality of transmission antennas.

When a number of the plurality of transmission antennas is equal to 2, the antenna designation information may designate which one of the two transmission antennas is used for transmitting the sounding signal.

When a number of the plurality of transmission antennas is equal to 4, the antenna designation information may designate which one of two transmission antenna groups is used for transmitting the sounding signal, each transmission antenna group including two transmission antennas.

Effects of the Invention

According to the exemplary embodiments of the present invention, by selecting an antenna through which a sounding signal is to be transmitted, and by turning-on an antenna that is to transmit only the sounding signal, the problem of antenna power imbalance may be resolved, and power consumption of the user equipment may be reduced.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the spirit and scope (or principle) of the invention.

BEST MODE FOR CARRYING OUT THE PRESENT INVENTION

The exemplary embodiments of the present invention may be supported by the disclosed standard documents of at least one of the radio access systems, such as an IEEE (Institute of Electrical and Electronics Engineers) 802.16m system, a 3GPP system, a 3GPP LTE system, and a 3GPP2 system. More specifically, among the exemplary embodiments of the present invention, the process steps or elements (or parts), which have not been described in this specification of the present invention in order to clearly disclose the technical spirit of the present invention, may be supported by the above-mentioned documents. Furthermore, all terms disclosed in the specification of the present invention may be described based upon the above-mentioned standard documents.

Furthermore, specific terms that are used in the description of the present invention are provided to facilitate and simplify the understanding of the present invention, and the usage of such specific terms may be varied within a range that does not deviate from the technical spirit of the present invention.

Hereinafter, a method for allocating sounding and a method for notifying sounding allocation according to the exemplary embodiment of the present invention will now be described in detail.

First of all, an uplink allocation control information element, which is used for uplink resource allocation, will be described in detail.

In the description of the present invention, an uplink allocation control information element may be referred to as an uplink allocation A-MAP IE (Advanced-Map Information Element).

Table 1 shown below corresponds to a table showing a structure of an uplink allocation A-MAP IE.

TABLE 1

| Syntax | Size in bits | Description/Notes |
|---|---|---|
| ... | | |
| if (PMI Indicator == 0b1){ | | |
|   if(NEF$_t$ == 2){ | | |
|     PMI | 3 | Precoding Matrix Index for NEF$_t$ = 2 |
|   } else if(NEF$_t$ == 4){ | | |
|     PMI | 6 | Precoding Matrix Index for NEF$_t$ = 4 |
|   } | | |
| } | | |
| ... | | |

In Table 1, NEF$_t$ indicates a number of valid transmission antennas acquired from an uplink sounding command A-MAP IE. Herein, a valid transmission antenna refers to an antenna that is used for performing transmission, among all of the antennas supported in the user equipment. For example, in case of a user equipment that supports a total of 4 antennas, and if 2 antennas among the 4 antennas are used for transmission, the number of valid transmission antennas is equal to 2.

In case there is no uplink sounding command A-MAP IE, the $NEF_t$ may be set to a number of transmission antennas ($N_t$).

Figure 4:
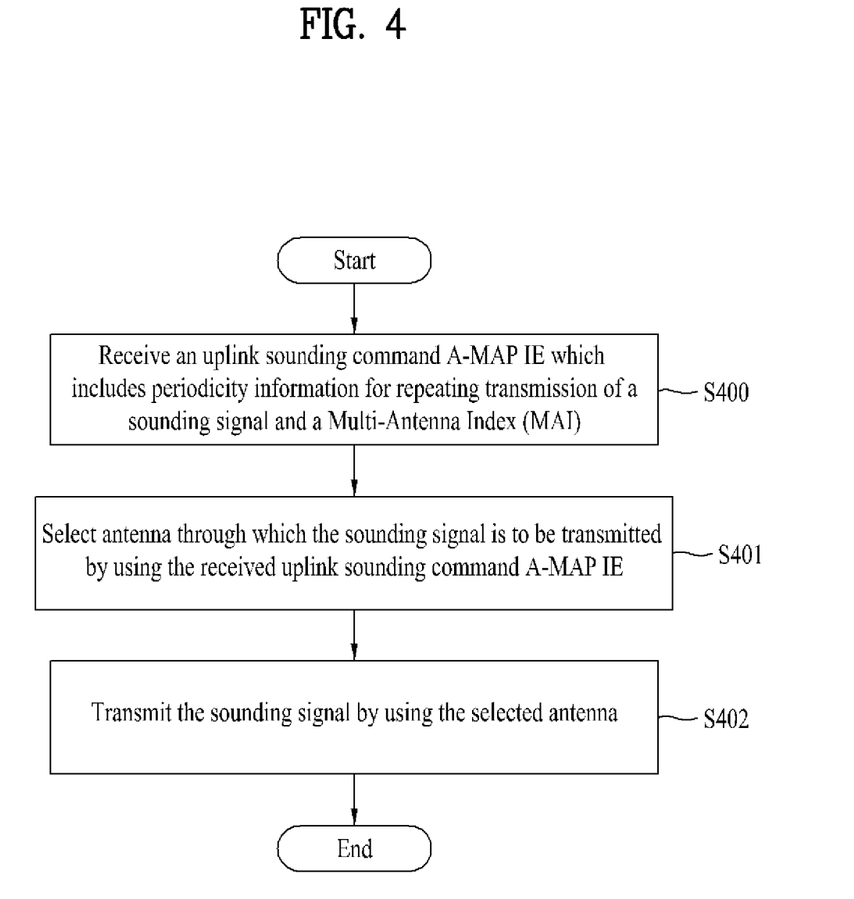
FIG. 4 illustrates a flow chart describing a method for performing sounding according to an exemplary embodiment of the present invention.

FIG. 4 illustrates a flow chart describing a method for performing sounding according to an exemplary embodiment of the present invention.

As shown in FIG. 4, the user equipment receives periodicity information for repeating sounding transmission and an uplink sounding command A-MAP IE, which includes Multi-Antenna Index (MAI) and antenna switching information, from the base station (S400).

Table 2 shown below shows a table indicating the structure (or configuration) of the uplink sounding command A-MAP IE according to the exemplary embodiment of the present invention.

Table 2 shown above describes in detail a field of an uplink sounding command A-MAP IE, which is used by the base station for requesting sounding transmission to the user equipment.

In Table 2, SCI indicates a unique decimation offset or cyclic time shift.

A decimal equivalent of a sounding subframe notifies an uplink subframe along with a sounding symbol. A sounding subband bitmap field is used for notifying a sounding subband, which is used for sounding allocation. In order to achieve the above-described purpose, $N_{used}$ number of consecutive subcarriers are divided into sounding subbands, and each sounding subband has $N_1 * N_{sc}$ number of adjacent subcarriers. At this point, the condition of $N_{sc}=18$ is satisfied. For a multiplexing type equal to 0, the first subcarrier index of a $K^{th}$ transmission antenna within the sounding allocation may be decided from g=F (d, k, frame index), and F( ) indicates a function.

TABLE 2

| Syntax | Size (bits) | Notes |
|---|---|---|
| UL Sounding Command IE format ( ) { | | |
| A-MAP IE Type | 4 | |
| Sounding subframe | 3 | Indicates the sounding subframe |
| Sounding subband bitmap | Variable [max. 12] | [TBD] FFT size dependent TBD |
| If (Multiplexing type == 0) { | | |
| Decimation offset (SCI) } else { | [4] or [5] | Unique decimation offset |
| Cyclic time shift (SCI) } | [4] or [5] | Unique cyclic shift |
| Periodicity (n) | 3 | 0b000 = Single command, not periodic, or terminate the periodicity. Otherwise, repeat sounding once per $2^{(n-1)}$ frames, where n is decimal value of the periodicity field |
| Multi-Antenna Index (MAI) | 2 | If the number of transmit antennas, $N_t$, is one, then this field shall be ignored, and the MS transmits sounding signals via sounding channel indicated by SCI. If the number of transmit antennas, $N_t$, is two, then this field indicates which transmit antennas to transmit sounding channel and the number of antennas in group (NAG) equals to 1. If i-th MSB bit of this field is '1', then the MS transmits sounding signals of i-th transmit antennas. If i-th MSB bit of this field is '0', then the MS does not transmit sounding signals of i-th transmit antennas. If the number of transmit antennas, $N_t$, is four, then this fields indicates which transmit antenna groups to transmit sounding channel and the number of antennas in group (NAG) equals to 2. If i-th MSB bit of this field is '1', then the MS transmits sounding signals of i-th group of transmit antennas which are NAG · i and NAG · i + 1. If i-th MSB bit of this field is '0', then the MS does not transmit sounding signals of i-th group of transmit antennas. |
| Antenna Switching | 1 | 0b0: Antenna switching AMS transmits sounding signals via sounding channels indicated by SCI. 0b1: No antenna switching AMS transmits sounding signals via sounding channels indicated by SCI to SCI + NSA-1. |
| Padding | [TBD] | Padding to reach byte boundary |
| MCRC } | 16 | 16 bit CRC masked by Station ID |

Also, a periodicity bit having the size of 3 bits is used for notifying the user equipment so that sounding transmission can be repeated periodically. When the periodicity bit is set to 0b000, this may notify a single sounding command or may end the periodic sounding.

MAI indicates an antenna or an antenna group, which is selected for sounding.

Additionally, NAG (Number of Antennas in Group) represents a number of antennas within an antenna group. Accordingly, if $N_t$ is equal to 1 or 2, NAG is equal to 1. And, when $N_t$ is equal to 4, NAG is equal to 2.

The value NSA, which indicates a number of sounding antennas, may be equal to a value of NAG multiplied by M. Herein, M corresponds to a number of 1s included in the MAI (Multiple Antenna Index) index.

Hereinafter, the MAI field will be described in detail. When $N_t$, which corresponds to the number of transmission antennas, is equal to 1, the MAI field is disregarded (or ignored), and the user equipment transmits a sounding signal through a sounding channel, which is notified by the SCI.

If the number of transmission antennas $N_t$ is equal to 2, the MAI field notifies the transmission antennas that are to transmit sounding channels, and NAG may correspond to 1.

In the MAI field, if an $i^{th}$ most significant bit (MSB) bit is equal to 1, the user equipment transmits a sounding signal through the $i^{th}$ transmission antenna.

In the MAI field, if an $i^{th}$ MSB bit is equal to 0, the user equipment does not transmit a sounding signal through the $i^{th}$ transmission antenna.

Also, if the number of transmission antennas $N_t$ is equal to 4, the MAI field notifies a group of transmission antennas (or transmission antenna group) that are to transmit sounding channels, and NAG corresponds to 2.

In the MAI field, if an $i^{th}$ MSB bit is equal to 1, the user equipment transmits a sounding signal through an $i^{th}$ antenna group, which is configured of an NAG·$i^{th}$ antenna and an NAG·i+1 $^{th}$ antenna.

In the MAI field, if an $i^{th}$ MSB bit is equal to 0, the user equipment does not transmit a sounding signal through the $i^{th}$ antenna group.

When an Antenna Switching Flag is equal to 0, the user equipment performs antenna switching, and, when the Antenna Switching Flag is equal to 1, the user equipment performs sounding through all transmission antennas.

A number of valid transmission antennas (NEF$_t$) may be set to NSA. A plurality of uplink sounding command A-MAP IEs may be transmitted to the user equipment. The NSA with a shorter cycle period is set as the NEF$_t$. If the periodicity bit value for the cycle period of the plurality of uplink sounding command A-MAP IEs is identical to one another, NEF$_t$ may be set to a number of transmission antennas ($N_t$) of the user equipment.

An uplink sounding channel between a plurality of user equipments and a plurality of antennas for each of the user equipments may be multiplexed by decimation separation or cyclic shift separation. Also, in case of a plurality of uplink subframes for sounding, by allocating different subframes to different user equipments, time division separation may be applied. For frequency decimation separation, each of the user equipments may use a subcarrier, which is decimated from a sounding allocation set having a different frequency offset.

For a user equipment that can select its own antenna, the base station may transmit a command ordering that the user equipment transmit a sounding waveform respective to a physical transmission antenna selected by the user equipment.

For a user equipment that can perform antenna switching and for a multi-antenna user equipment, the base station may transmit a command ordering the user equipment to switch its physical transmission antenna in order to perform sounding transmission. In order to perform sounding along with antenna switching, the user equipment may transmit a sounding signal through an $i^{th}$ antenna (wherein 0, 1, ..., NSA$_t$−1 number of antennas exist) over a frame of t=j×2$^{(n-1)}$+i. Herein, t=0 corresponds to a frame in which an uplink sounding A-MAP IE is received. Also, n correspond to a cycle period in an uplink sounding command A-MAP IE, and j corresponds to a running index a=0, 1, 2, ... for n≠0 and j=0 for n=0).

For antenna switching and periodic sounding allocation (n≠0), the allocation cycle period (or periodicity) $2^{(n-1)}$ may be greater than or equal to NSA, which corresponds to a number of sounding antennas.

After receiving the uplink sounding command A-MAP IE, which is configured as described above, the user equipment selects an antenna through which a sounding signal is to be transmitted, by using the above-described information (S401). Thereafter, the user equipment uses the selected antenna to transmit the sounding signal (S402).

As described above, by selecting an antenna through which the sounding signal is to be transmitted, and by turning-on the antenna that is to transmit only the sounding signal, among the selected antennas, the problem of antenna power imbalance may be resolved, and the power consumption of the user equipment may also be reduced.

Figure 5:
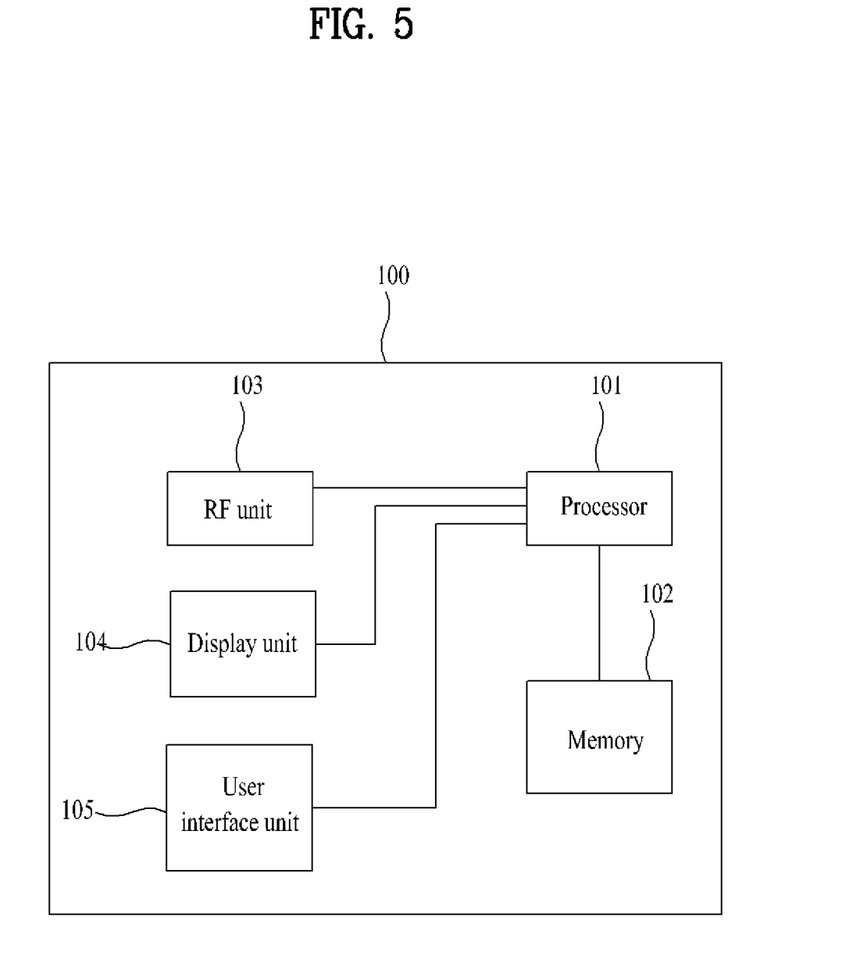
FIG. 5 illustrates a block view showing the structures of a device that can be applied to a base station and a user equipment and that can perform the embodiment of the present invention.

FIG. 5 illustrates a block view showing the structures of a device that can be applied to a base station and a user equipment and that can perform the embodiment of the present invention. As shown in FIG. 5, a device (100) includes a processing unit (101), a memory unit (102), an RF (Radio Frequency) unit (103), a display unit (104), and a user interface unit (105). A layer of a physical interface protocol is performed in the processing unit (101). And, the processing unit (101) provides a control plane and a user plane. The function of each layer is performed by the processing unit (101). The processing unit (101) may perform the above-described exemplary embodiments of the present invention. More specifically, the processing unit (101) may perform a function of generating a subframe for determining user equipment location, or the processing unit (101) may perform a function of receiving the subframe and determining the user equipment location. The memory unit (102) is electrically connected to the processing unit (101) and stores an operating system, applications, and general files. If the device (100) corresponds to a user device, the display unit (104) may display diverse information. And, the display unit (104) may be realized by using as LCD (Liquid Crystal Display), OLED (Organic Light Emitting Diode) as disclosed herein. The user interface unit (105) may be configured by being combined with any one of the disclosed user interfaces, such as a keypad, a touch-screen, and so on. RF unit (103) is electrically connected to the processing unit (101) and either transmits or receives radio signals.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the present invention, the term User Equipment (UE) may be replaced with the terms MS (Mobile Station), SS (Subscriber Station), MSS (Mobile Subscriber Station), or Mobile Terminal, and so on.

Meanwhile, PDAs (Personal Digital Assistants), cellular phones, PCS (Personal Communication Service) phones, GSM (Global System for Mobile) phones, WCDMA (Wideband CDMA) phones, MBS (Mobile Broadband System) phones may be used as the UE of the present invention.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

Industrial Applicability

The present invention may be used in a user equipment (or user terminal), a base station, or any other equipment of a wireless mobile communication system.

What is claimed is:

1. In a wireless mobile communication system supporting Multiple Input Multiple Output (MIMO), a method for transmitting a sounding signal, comprising:

receiving, by a user equipment supporting multiple transmission antennas, a plurality of uplink sounding transmission control information elements from a base station, wherein each of the plurality of uplink sounding transmission control information elements includes respective cyclic period information for periodically repeating sounding signal transmission and respective antenna designation information for designating one or more antennas through which the sounding signal is to be transmitted among a plurality of transmission antennas of the user equipment; and transmitting the sounding signal through the designated one or more transmission antennas according to the antenna designation information of an uplink sounding transmission control information element having a shortest cycle period among the plurality of uplink sounding transmission control information elements.

2. The method of claim 1, wherein, when the user equipment supports two transmission antennas, the antenna designation information designates which one of the two transmission antennas is used for transmitting the sounding signal.

3. The method of claim 1, wherein, when the user equipment supports four transmission antennas, the antenna designation information designates which one of two transmission antenna groups is used for transmitting the sounding signal, each transmission antenna group including two transmission antennas.

4. The method of claim 1, wherein, when the respective cyclic period information of the plurality of uplink sounding transmission control information elements is the same, the designated one or more transmission antennas corresponds to a number of the plurality of transmission antennas of the user equipment.

5. In a wireless mobile communication system supporting Multiple Input Multiple Output (MIMO), a method for transmitting uplink sounding signal control information, comprising:

transmitting a plurality of uplink sounding transmission control information elements to a user equipment supporting multiple transmission antennas, wherein each of the plurality of uplink sounding transmission control information elements includes respective cyclic period information for periodically repeating sounding signal transmission and respective antenna designation information for designating one or more antennas through which the sounding signal is to be transmitted among a plurality of transmission antennas of the user equipment; and receiving, from the user equipment, a sounding signal to which the antenna designation information of an uplink sounding transmission control information element having a shortest cycle period among the plurality of uplink sounding transmission control information elements is applied.

6. The method of claim 5, wherein, when a number of the plurality of transmission antennas is equal to 2, the antenna designation information designates which one of the two transmission antennas is used for transmitting the sounding signal.

7. The method of claim 5, wherein, when a number of the plurality of transmission antennas is equal to 4, the antenna designation information designates which one of two transmission antenna groups is used for transmitting the sounding signal, each transmission antenna group including two transmission antennas.

8. In a wireless mobile communication system supporting Multiple Input Multiple Output (MIMO), a user equipment supporting a plurality of transmission antennas, comprising:
a receiving unit configured to receive a plurality of uplink sounding transmission control information elements from a base station, wherein each of the plurality of uplink sounding transmission control information elements includes respective cyclic period information for periodically repeating sounding signal transmission and respective antenna designation information for designating one or more antennas through which the sounding signal is to be transmitted among a plurality of transmission antennas of the user equipment; and
a processing unit configured to be electrically connected to the receiving unit, to generate a sounding signal by using the received uplink sounding transmission control information elements, and to select transmission antennas among the plurality of transmission antennas to transmit the sounding signal, wherein the number of selected transmission antennas is in accordance with the antenna designation information of an uplink sounding transmission control information element having a shortest cycle period among the plurality of uplink sounding transmission control information elements; and
a transmitting unit configured to be electrically connected to the processing unit and to transmit the generated sounding signal.

9. The user equipment of claim 8, wherein, when a number of the plurality of transmission antennas is equal to 2, the antenna designation information designates which one of the two transmission antennas is used for transmitting the sounding signal.

10. The user equipment of claim 8, wherein, when a number of the plurality of transmission antennas is equal to 4, the antenna designation information designates which one of two transmission antenna groups is used for transmitting the sounding signal, each transmission antenna group including two transmission antennas.

11. The user equipment of claim 8, wherein, when the respective cyclic period information of the plurality of uplink sounding transmission control information elements is the same, the selected number of transmission antennas corresponds to a number of the plurality of transmission antennas of the user equipment.

12. In a wireless mobile communication system supporting Multiple Input Multiple Output (MIMO), a base station comprising:
a processing unit configured to generate a plurality of uplink sounding transmission control information elements for a user equipment supporting a plurality of transmission antennas, wherein each of the plurality of uplink sounding transmission control information elements includes respective cyclic period information for periodically repeating sounding signal transmission and respective antenna designation information for designating one or more antennas through which the sounding signal is to be transmitted among a plurality of transmission antennas of the user equipment;
a transmitting unit configured to be electrically connected to the processing unit and to transmit the generated uplink sounding transmission control information elements; and
a receiving unit configured to be electrically connected to the transmitting unit and to receive from the user equipment a sounding signal to which the antenna designation information of an uplink sounding transmission control information element having a shortest cycle period among the plurality of uplink sounding transmission control information elements is applied.

13. The base station of claim 12, wherein, when a number of the plurality of transmission antennas is equal to 2, the antenna designation information designates which one of the two transmission antennas is used for transmitting the sounding signal.

14. The base station of claim 12, wherein, when a number of the plurality of transmission antennas is equal to 4, the antenna designation information designates which one of two transmission antenna groups is used for transmitting the sounding signal, each transmission antenna group including two transmission antennas.

* * * * *